L. FINE.
PRESSED METAL WHEEL.
APPLICATION FILED MAY 12, 1919.
1,411,427.
Patented Apr. 4, 1922.
2 SHEETS—SHEET 2.
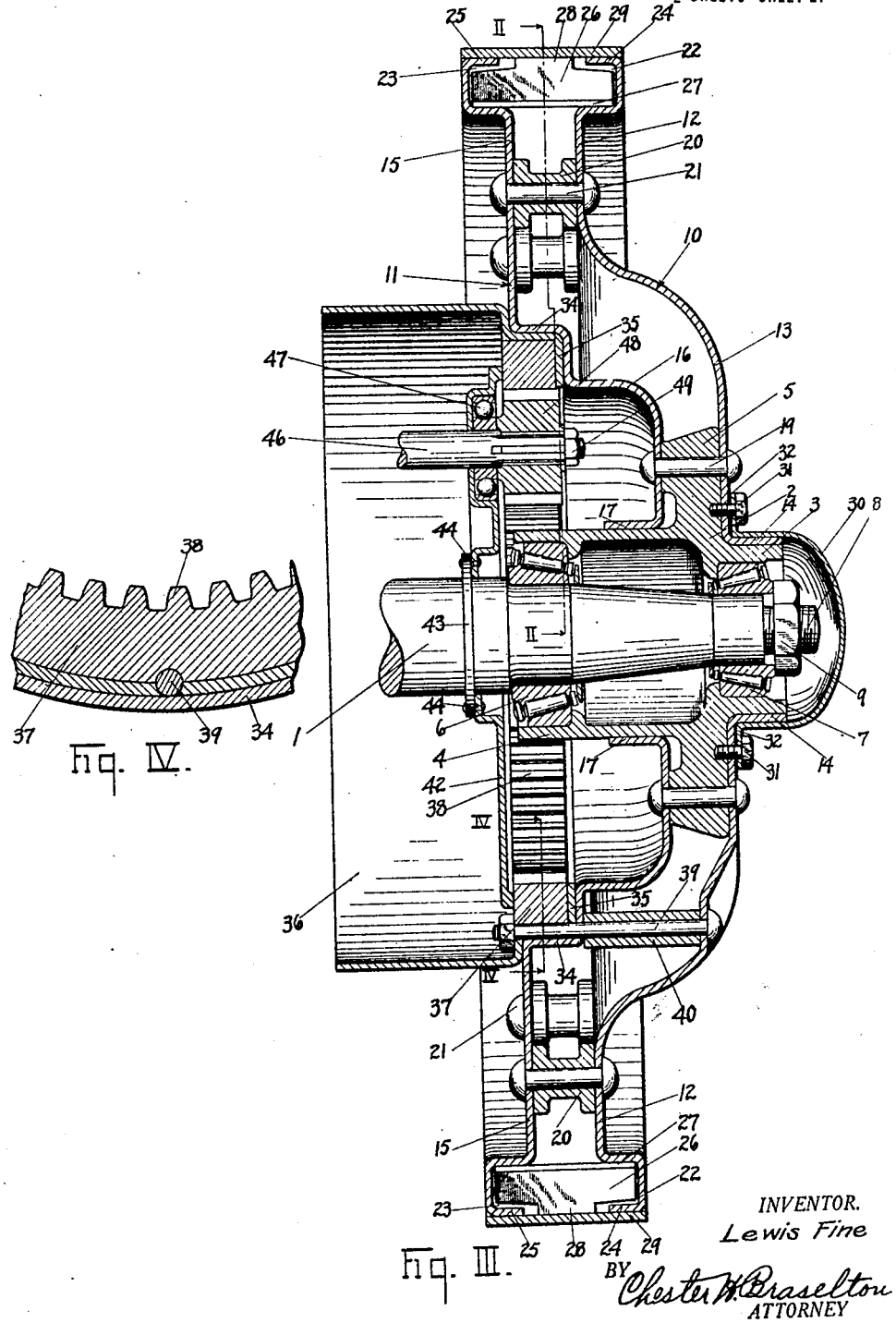
INVENTOR.
Lewis Fine
BY
Chester H. Braselton
ATTORNEY

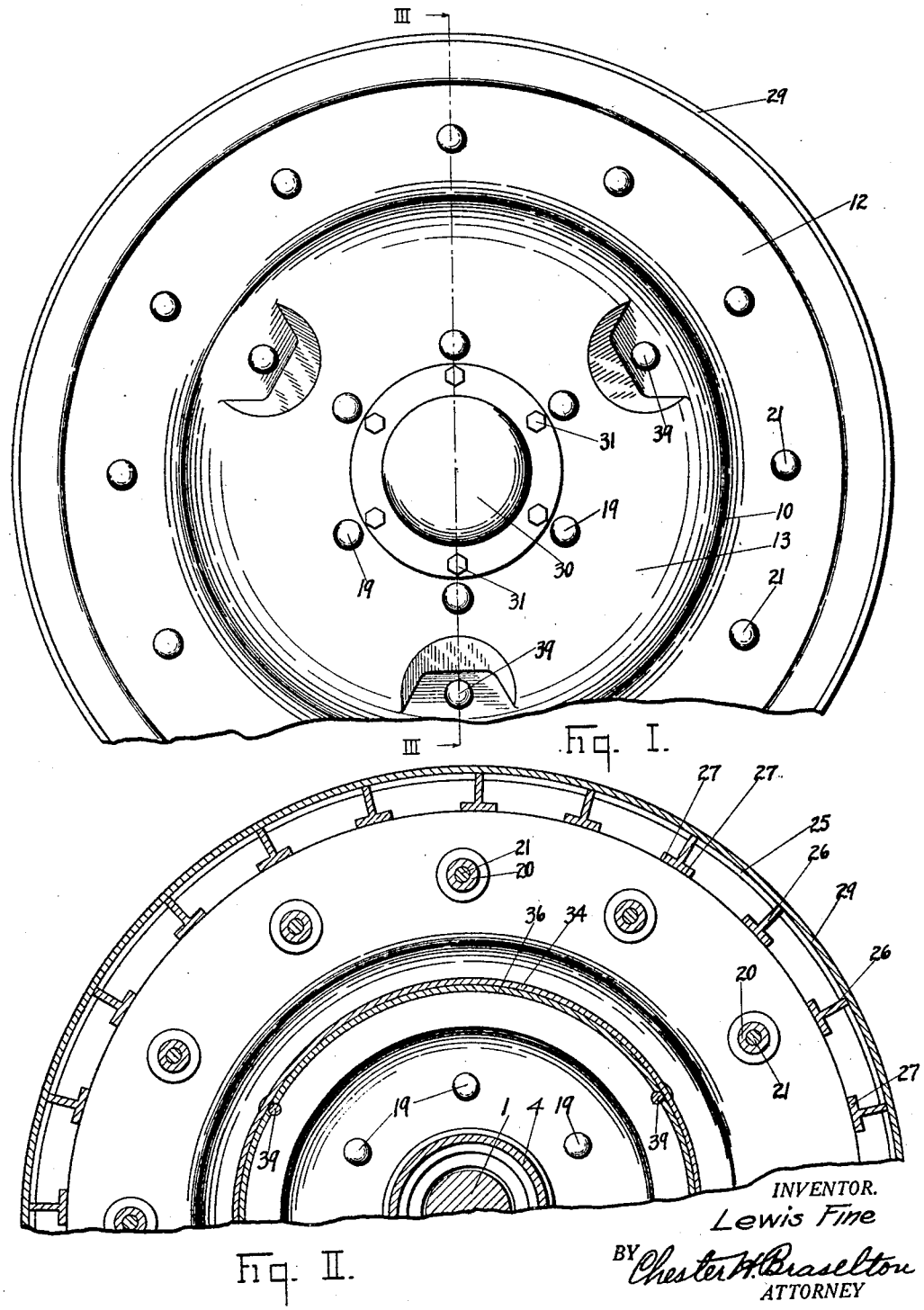

UNITED STATES PATENT OFFICE.

LEWIS FINE, OF PHILADELPHIA, PENNSYLVANIA, ASSIGNOR, BY MESNE ASSIGNMENTS, TO BUDD WHEEL COMPANY, OF PHILADELPHIA, PENNSYLVANIA, A CORPORATION OF PENNSYLVANIA.

PRESSED-METAL WHEEL.

1,411,427. Specification of Letters Patent. Patented Apr. 4, 1922.

Application filed May 12, 1919. Serial No. 296,626.

*To all whom it may concern:*

Be it known that I, LEWIS FINE, a citizen of the United States, residing at Philadelphia, Pennsylvania, have invented certain new and useful Improvements in Pressed-Metal Wheels, of which I declare the following to be a full, clear, and exact description.

This invention relates to improvements in metal wheels, and more particularly to that type of metal wheels commonly known as disc wheels, which are especially adapted for use in connection with trucks, tractors, and the like.

One object of the invention is to provide a wheel of this character, which is of simple construction and efficient in operation.

A further object of the invention is to provide a metal wheel of the disc type having driving connections such that the driving power is applied to the wheel substantially within the central longitudinal plane of the wheel tread.

A further object of the invention is to provide a metal wheel of the disc type wherein the disc portion is offset centrally from the central longitudinal plane of the wheel tread.

A further object of the invention is to provide a metal wheel of the disc type wherein the supporting hub is provided with an axle bearing positioned substantially within the central longitudinal plane of the wheel tread.

Further objects of this invention relate to economies of manufacture and details of construction, as will hereinafter appear from the detailed description to follow.

The objects of the invention are accomplished in one instance by the devices and means described in the following specification, but it is evident that the same may be varied widely without departing from the scope of the invention, as pointed out in the appended claims.

A structure constituting one embodiment of the invention, which may be the preferred, is illustrated in the accompanying drawings forming a part hereof, in which:

Figure I is a view in side elevation of a metal wheel embodying my invention.

Figure II is a partial, vertical, sectional view, taken along the line II—II of Figure III.

Figure III is a transverse, vertical sectional view, taken along the line III—III of Figure I.

Figure IV is a fragmentary detail, sectional view, taken along the line IV—IV of Figure III, and illustrating the manner of securing the driving gear and the brake drum to the wheel structure.

In the drawings, similar reference characters designate corresponding parts throughout the several views, and the sectional views are taken looking in the direction of the small arrows at the ends of the section lines.

In the embodiment of the invention illustrated herewith, 1 designates an axle of the usual construction upon which is rotatably mounted a wheel hub 2 provided with cylindrical portions 3 and 4 extending from the central portion of the hub and being provided with an intermediate radially extending annular flange 5 positioned between the cylindrical portions 3 and 4, and adapted to serve as a spacing means for the wheel discs. The hub is rotatably mounted upon the axle 1 and is preferably provided with a pair of axle bearings 6 and 7 of the usual anti-friction type, the bearing 6 being substantially positioned within the central longitudinal plane of the wheel tread, while the axle bearing 7 is offset laterally from the central longitudinal plane of the wheel tread towards the end of the axle. The axle 1 is provided with a threaded end portion 8 upon which is threaded a nut 9, which serves to retain the hub and the several parts of the anti-friction bearings in proper position relative to each other and to the axle.

The main portion of the wheel structure comprises a pair of wheel discs 10 and 11 which are spaced from each other and serve to support the rim in proper position relative to the wheel hub. The outer wheel disc 10 has a straight portion 12 located in proximity to the wheel rim, and a central portion 13 which is substantially parallel thereto and offset therefrom and from the central longitudinal plane of the wheel tread. The outer wheel disc 10 is provided with a central opening therein and the metal of the disc is struck up around said opening to form the outwardly extending flange 14 which is adapted to rest upon and bear against the surface of the outwardly extending cylindrical portion 3 of the wheel hub. In a similar manner, the inner wheel disc 11 is provided with a straight portion 15 located adjacent the wheel rim, and a central offset portion 16 which is substantially parallel thereto and offset outwardly from the central longitudinal plane of the wheel tread. The inner wheel disc 11 is provided with a central opening therein. The metal of the disc is struck up to form an inwardly extending annular flange 17 surrounding the central opening and resting upon and bearing against the outer surface of the inwardly extending cylindrical portion 4 of the wheel hub. The central offset portions 13 and 16 of the wheel discs 10 and 11 are positioned upon opposite sides of the radially extending annular flange 5 of the wheel hub, to which they are secured by means of a plurality of bolts or rivets 19 passing through registering openings formed in the plates 10 and 11 and the annular flange 5 of the wheel hub.

The annular radially extending flange 5 of the wheel hub serves as a spacing means for properly spacing the offset portions 13 and 16 of the wheel discs from each other, as well as to secure the wheel discs in proper position relative to the wheel hub. A plurality of spacing sleeves 20 are positioned between the straight portions 12 and 15 of the wheel discs 10 and 11, and the wheel discs are retained in position, relative to each other and the spacing sleeves 20, by means of a plurality of bolts or rivets 21, which extend through registering openings formed in the wheel discs and through the spacing sleeves in such a manner as to retain the outer portions of the wheel discs in proper position relative to each other.

The outer portions of the wheel discs are bent outwardly, radially and then inwardly to form opposed channels 22 and 23 which register with each other and have the inturned peripheral flanges 24 and 25. A plurality of T-shaped cross braces 26 are positioned so that the opposite ends thereof extend into the oppositely positioned registering channels 22 and 23 and rest upon the outwardly bent portions of the wheel discs, by which they are supported. Each of the T-shaped cross braces 26 has a pair of transversely extending flanges 27 extending from the main web portion thereof, the said flanges being adapted to rest upon the outwardly bent portions of the wheel discs so as to properly support the T-shaped cross braces. Each of the T-shaped cross braces is provided with a main web portion 28, which, in the assembled position of the cross braces, extends between the inner edges of the inturned flanges 24 and 25 and terminates substantially flush with the outer surfaces of the inturned flanges.

The web portion 28 is cut away at its ends as shown in Fig. III to accommodate the inturned flanges 24 and 25. A rim 29 is shrunk upon the outer surfaces of the inturned flanges 24 and 25 in such a manner as to be properly supported thereby and by the outwardly extending portions 28 of the T-shaped cross braces.

A hub cap 30 is positioned upon the outer portion of the hub, being adapted to slide over the outwardly extending annular flange 14 formed upon the outer wheel disc 10, and is secured to the wheel hub by means of a plurality of attaching screws 31. A strip of suitable packing material 32 may be positioned between the hub cap 30 and the outer surface of the wheel disc 10 for the purpose of forming a tight joint.

The inner wheel disc 11 has an intermediate offset portion 34 between the straight portion 15 and the main offset portion 16 thereof, said offset portion 34 being in the central longitudinal plane of the wheel tread and formed in such a manner as to receive the flanged portion 35 of the brake drum 36, which fits within and bears against the inner surface of the offset portion 34 of the wheel disc 11. An internal driving gear 37, provided with a plurality of internal teeth 38, is positioned within and bears against the inner surface of the annular flange 35 of the brake drum 36, and the driving gear, brake drum and inner wheel disc 11 are all secured together and to the wheel disc 10 by means of a plurality of bolts 39 extending through registering openings in these parts. Spacing sleeves 40 are positioned between the inner and outer wheel discs 10 and 11 so that the bolts 39 pass therethrough, the said spacing sleeves serving to properly space the wheel discs 10 and 11 from each other. It will be seen that, by reason of this construction, the brake drum and the driving gear 37 are detachably secured to the wheel disc, and the driving gear is positioned substantially within the central longitudinal plane of the wheel tread. A cover plate 42 is secured to an annular flange 43, carried by the axle, by means of a plurality of suitable fastening means such as rivets 44, said plate extending radially away from the axle and having the peripheral edge portion thereof bearing against the inner side of the driving gear 37 so as to provide a closure for the inner side of the hub structure and the driving connections. A driving shaft 46 projects through an opening formed in the cover plate 42 and is rotatably supported in an anti-friction bearing 47 carried by the cover plate. Non-rotatably secured to the inner end of the driving shaft 46 in any suitable manner, as by being splined thereon, is a driving pinion 48 so positioned as to mesh with the internal gear 37 carried by the wheel structure and constitutes therewith a driving connection for the wheel. A nut 49 is threaded upon the outer end of the driving shaft 46 so as to retain the driving pinion in proper position upon the driving shaft.

It will be evident from the above description that a metal wheel of the disc type is provided, which forms a firm and rigid structure, and is capable of being cheaply constructed and easily assembled to provide an efficient construction. The axle bearing and the driving connection are suitably inclosed so as to protect the bearings and driving connections from injury and prevent the entrance of dust or other foreign matter into contact with the working parts. It will be noted that the driving connection is positioned substantially within the central longitudinal plane of the wheel tread in such a manner as to most effectively apply the driving power to rotate the wheel. By offsetting the central portions of the wheel discs suitable space is provided for the accommodation of the driving connections and the positioning of the same within the central longitudinal plane of the wheel tread, while the central offset portions of the wheel discs are suitably supported by the hub.

While I have shown and described in considerable detail a specific embodiment of my invention, it is to be understood that this showing and description is illustrative only and for the purpose of rendering my invention more clear, and that I do not regard the invention as limited to the details of construction illustrated or described, nor any of them, except in so far as I have included such limitations within the terms of the following claims, in which it is my intention to claim all novelty inherent in my invention broadly as well as specifically.

Having thus described my invention, what I claim as new and desire to secure by Letters Patent is:

1. In a wheel structure, a pair of sheet metal wheel discs spaced from each other throughout, each of said discs having an outer, vertical portion and a parallel, inner vertical portion offset therefrom, the inner, vertical portion of each disc being offset in the same direction from the central, longitudinal plane of the wheel, and a hub supporting the wheel discs.

2. In a wheel structure, a pair of spaced sheet metal wheel discs suitably connected together, and a driving connection for the wheel carried by said discs, substantially in line with the central longitudinal plane of the wheel tread.

3. In a wheel structure, a pair of spaced sheet metal wheel discs each provided with a central offset portion and suitably connected together, and a driving gear secured to one of the wheel discs substantially in line with the central longitudinal plane of the wheel tread.

4. In a wheel structure, a pair of spaced sheet metal wheel discs, each provided with a central offset portion and suitably connected together, a hub supporting the wheel discs and offset from the central longitudinal plane of the wheel, and a driving connection for the wheel substantially in line with the central longitudinal plane of the wheel tread.

5. In a wheel structure, a pair of wheel discs spaced from each other and each provided with an outer, vertical portion and a central, vertical, offset portion, the central, vertical portion of each disc being offset in the same direction from the central, longitudinal plane of the wheel; and a hub having a flange portion positioned between the central portions of the disc and supporting the same.

6. In a wheel structure, a pair of spaced sheet metal wheel discs, a hub positioned centrally of the wheel discs and supporting the same, said hub having a flange extending between the discs, and an axle bearing for the hub located substantially within the central longitudinal plane of the wheel tread.

7. In a wheel structure, the combination of a hub, a rim, and a pair of wheel discs connecting said hub and rim, one of said wheel discs cutting the central longitudinal plane of the wheel tread midway of the disc and the other wheel disc lying entirely to one side of said plane.

8. In a wheel structure, the combination of a hub, a rim and inner and outer wheel discs connecting said hub and rim, said inner disc cutting the central longitudinal plane of the wheel tread midway between the centre and the periphery of said disc and said outer disc lying entirely to one side of said plane.

9. In a wheel structure, the combination of a rim, a hub, inner and outer bearings for said hub, and inner and outer wheel discs having outer, vertical portions connected to said rim in line with said inner bearing and inner, vertical portions connected to said hub substantially in line with said outer bearing.

10. In a wheel structure, the combination of a rim, a hub, inner and outer wheel discs connecting said rim and hub, said inner disc being offset to form an annular seat lying substantially in the central longitudinal plane of the wheel tread, and a driving gear seated therein and rigidly connected to said discs.

11. In a wheel structure, the combination of a hub, a pair of wheel discs mounted on said hub, and a rim carried by said wheel discs, one of said discs lying entirely to one side of the central plane of the rim, and the other disc supporting the rim on the opposite side of said plane and cutting said plane between said rim and the hub.

12. In a wheel structure, the combination of a hub, inner and outer wheel discs carried by said hub, a rim supported on the peripheries of said discs, the outer disc lying entirely on the outer side of the central plane of the rim and the inner disc cutting said plane between the rim and the hub, and a driving gear secured to said disc at the line where it cuts said plane.

13. In a wheel structure, the combination of a hub having an annular flange near the outer end thereof, a pair of spaced, stamped metal discs each having an outer and an inner, vertical portion, the inner, vertical portions being both offset toward the outer end of the hub and engaging and secured to the opposite faces of said flange, and a rim carried by the peripheral portions of said disc, the offset portion of the inner disc forming an annular recess surrounding the inner end of the hub.

14. In a wheel structure, the combination of a hub having an annular flange near the outer end thereof, a pair of spaced, stamped metal discs each having an outer and an inner, vertical portion, the inner, vertical portions being both offset toward the outer end of the hub and engaging and secured to the opposite faces of said flange, and a rim carried by the peripheral portions of said disc with the central plane of the wheel tread in line with the inner end of said hub, the offset portion of the inner disc forming an annular recess surrounding the inner end of the hub.

15. In a wheel structure, the combination of a hub having an annular flange near the outer end thereof, a pair of spaced, stamped metal discs each having an outer and an inner, vertical portion, the inner, vertical portions being both offset toward the outer end of the hub and engaging and secured to the opposite faces of said flange, a rim carried by the peripheral portions of said disc, the offset portion of the inner disc forming an annular recess surrounding the inner end of the hub, and means for securing a driving gear within said recess and in line with the central plane of the wheel tread.

16. In a wheel structure, the combination of a hub having an annular flange near the outer end thereof, a pair of spaced, stamped metal discs each having an outer and an inner, vertical portion, the inner, vertical portions being both offset toward the outer end of the hub and engaging and secured to the opposite faces of said flange, reinforcing means for said wheel structure comprising a plurality of spacing members interposed between the outer, vertical portions of said discs and means for drawing the discs together against said spacing members, and a rim carried by the peripheral portions of said discs, the offset portion of the inner disc forming an annular recess surrounding the inner end of the hub.

In testimony whereof I affix my signature.

LEWIS FINE.